United States Patent
Shu et al.

(10) Patent No.: US 8,984,508 B2
(45) Date of Patent: Mar. 17, 2015

(54) SYSTEM AND METHOD FOR RESTARTING A WORKLOAD BASED ON GLOBAL LOAD BALANCING

(75) Inventors: Guoqiang Shu, San Jose, CA (US);
Keith Farkas, San Carlos, CA (US);
Eddie Ma, San Ramon, CA (US);
Michael Nelson, San Francisco, CA (US); Elisha Ziskind, Sharon, MA (US);
Sridhar Rajagopal, Sunnyvale, CA (US); Minwen Ji, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 519 days.

(21) Appl. No.: 13/151,862

(22) Filed: Jun. 2, 2011
(Under 37 CFR 1.47)

(65) Prior Publication Data
US 2012/0311576 A1    Dec. 6, 2012

(51) Int. Cl.
G06F 9/455    (2006.01)
G06F 9/46     (2006.01)
G06F 9/48     (2006.01)
G06F 9/50     (2006.01)

(52) U.S. Cl.
CPC .......... *G06F 9/4818* (2013.01); *G06F 9/45558* (2013.01); *G06F 9/5077* (2013.01); *G06F 2009/45575* (2013.01)
USPC .............................................. 718/1; 718/105

(58) Field of Classification Search
CPC . G06F 9/4818; G06F 9/45558; G06F 9/5077; G06F 2009/45575
USPC ............................................. 718/1, 104, 105
See application file for complete search history.

(56) References Cited

U.S. PATENT DOCUMENTS

| | | | | |
|---|---|---|---|---|
| 5,701,502 A * | 12/1997 | Baker et al. | ........... | 709/201 |
| 7,370,164 B1 * | 5/2008 | Nagarkar et al. | ........... | 711/162 |
| 7,472,156 B2 * | 12/2008 | Philbrick et al. | ........... | 709/201 |
| 7,925,923 B1 * | 4/2011 | Hyser et al. | ........... | 714/13 |
| 8,140,812 B2 * | 3/2012 | Arroyo et al. | ........... | 711/170 |
| 8,332,847 B1 * | 12/2012 | Hyser et al. | ........... | 718/1 |
| 2002/0023127 A1 * | 2/2002 | Sabeti | ........... | 709/203 |
| 2003/0018927 A1 * | 1/2003 | Gadir et al. | ........... | 714/4 |
| 2004/0172574 A1 * | 9/2004 | Wing et al. | ........... | 714/4 |
| 2005/0203890 A1 * | 9/2005 | Chen et al. | ........... | 707/3 |
| 2007/0300220 A1 * | 12/2007 | Seliger et al. | ........... | 718/1 |
| 2008/0189700 A1 * | 8/2008 | Schmidt et al. | ........... | 718/1 |
| 2009/0313447 A1 * | 12/2009 | Nguyen et al. | ........... | 711/162 |
| 2010/0107158 A1 * | 4/2010 | Chen et al. | ........... | 718/1 |
| 2011/0004735 A1 * | 1/2011 | Arroyo et al. | ........... | 711/162 |
| 2011/0125894 A1 * | 5/2011 | Anderson et al. | ........... | 709/224 |
| 2012/0042311 A1 * | 2/2012 | Biran et al. | ........... | 718/1 |
| 2012/0311576 A1 * | 12/2012 | Shu et al. | ........... | 718/1 |
| 2013/0073730 A1 * | 3/2013 | Hansson et al. | ........... | 709/226 |
| 2014/0122920 A1 * | 5/2014 | Ziskind et al. | ........... | 714/4.11 |

OTHER PUBLICATIONS

Laverick, Mike. "VMware vSphere 4 Implementation," ISBN 978-0-07-166453-0, Ch. 13—VMware Distributed Resource Scheduler, pp. 395-422 (2010).

* cited by examiner

*Primary Examiner* — Emerson Puente
*Assistant Examiner* — Willy W Huaracha

(57) ABSTRACT

A method for restarting a virtual machine in a virtual computing system having a plurality of hosts and a resource scheduler for the plurality of hosts includes writing a placement request for the virtual machine to a shared channel that is accessible by the resource scheduler. The method further includes reading a placement result from the shared channel, wherein the placement result is generated by the resource scheduler responsive to the placement request; and restarting the virtual machine in accordance with the placement result.

14 Claims, 7 Drawing Sheets

SYSTEM AND METHOD FOR RESTARTING A WORKLOAD BASED ON GLOBAL LOAD BALANCING

BACKGROUND

Virtualization management software enables multiple virtual machines to be executed on a single hardware computing platform and manages the allocation of computing resources to each virtual machine. A set of hardware computing platforms can be organized as a server cluster to provide computing resources for a data center. In addition, the virtualization management software can be configured to move virtual machines between servers (also referred to herein as "host systems" or "host computers") in the cluster. An example of this supporting technology is sold as VMware VMotion® by VMware, Inc. of Palo Alto, Calif. An example of the virtualization management software is sold as VMware Distributed Resource Scheduler™ by VMware, Inc. of Palo Alto, Calif.

A cluster resource management service for a virtualized computing environment handles the placement and scheduling of a set of virtual machines (VMs) on a set of hosts that each belong to a cluster, in accordance with a set of constraints and objectives. To address constraint violations and achieve objectives, the cluster resource management service generates and can automatically execute migrations of VMs between hosts and can recommend powering hosts on or off. For a VM to be powered-on on a host within a cluster, the cluster needs to have sufficient computing resources compatible with the VM's execution constraints to meet the VM's admission control requirements, and those resources must be available in unfragmented form, i.e., all on a single host in the cluster.

Additionally, virtualized computing environments can implement a wide variety of redundancy techniques to establish a high availability system, or "HAS." Such techniques set aside resources, such as hardware, systems, components, subsystems or even software, so that in the event of a failure, relevant functionality may be maintained or quickly recovered. Redundancy may be provided at any of a variety of levels. For example, conventional techniques for managing redundant information storage or transmission can use error correcting codes, cyclic redundancy checks, and/or storage array technologies such as RAID ("Reliable Array of Inexpensive Disks"). Also, redundant subsystems such as power supplies or storage controllers can be employed to improve system availability.

However, in most prior art systems, the resource scheduler operates independently of the HAS. Thus, in the event that a VM fails and is restarted by the HAS, the placement of the VM onto an alternate host is often not optimal because the HAS no global knowledge of the load of the cluster. Subsequently, the resource scheduler needs to rebalance the load with the VM running on the alternate host. This process is inefficient and can significantly degrade the efficacy of implementing the resource scheduler and/or HAS.

SUMMARY

One or more embodiments of the invention provide a technique for restarting affected workloads based on global information for the virtualized environment, such as load. In this technique, a high availability system (HAS) is configured to write placement requests to a shared channel that is also accessible by a global resource scheduler. The resource scheduler reads the write placement requests and computes an optimal placement for the affected workloads. The HAS and/or the resource scheduler then executes the placements. By providing these features, the techniques according to one or more embodiments provide a more efficient technique for restarting failed workloads.

One embodiment provides a method for restarting a virtual machine in a virtual computing system having a plurality of hosts and a resource scheduler for the plurality of hosts includes writing a placement request for the virtual machine to a shared channel that is accessible by the resource scheduler. The method further includes reading a placement result from the shared channel, where the placement result is generated by the resource scheduler responsive to the placement request; and restarting the virtual machine in accordance with the placement result.

Another embodiment provides a method for computing a placement result for a virtual machine in a virtual computing system. The method includes reading a placement request for the virtual machine from a shared channel; computing a placement result for the virtual machine, where the placement result includes information corresponding to a host computer on which the virtual machine is to be restarted; and writing the placement result to the shared channel, wherein the virtual machine is restarted in accordance with the placement result.

DETAILED DESCRIPTION

One or more embodiments of the invention provide a technique for restarting affected workloads by taking into account global information for the virtualized environment, such as load. A high availability system (HAS) is configured to write placement requests to a shared channel that is also accessible by a global resource scheduler. The resource scheduler reads the write placement requests and computes an optimal placement for the affected workloads. The HAS and/or the resource scheduler then executes the placements. By providing these features, the techniques according to one or more embodiments provide a more efficient technique for restarting failed workloads. In prior art techniques, the HAS responsible for restarting affected workloads does not have access to global knowledge of the virtualized environment, such as load balancing capability.

Figure 1A:
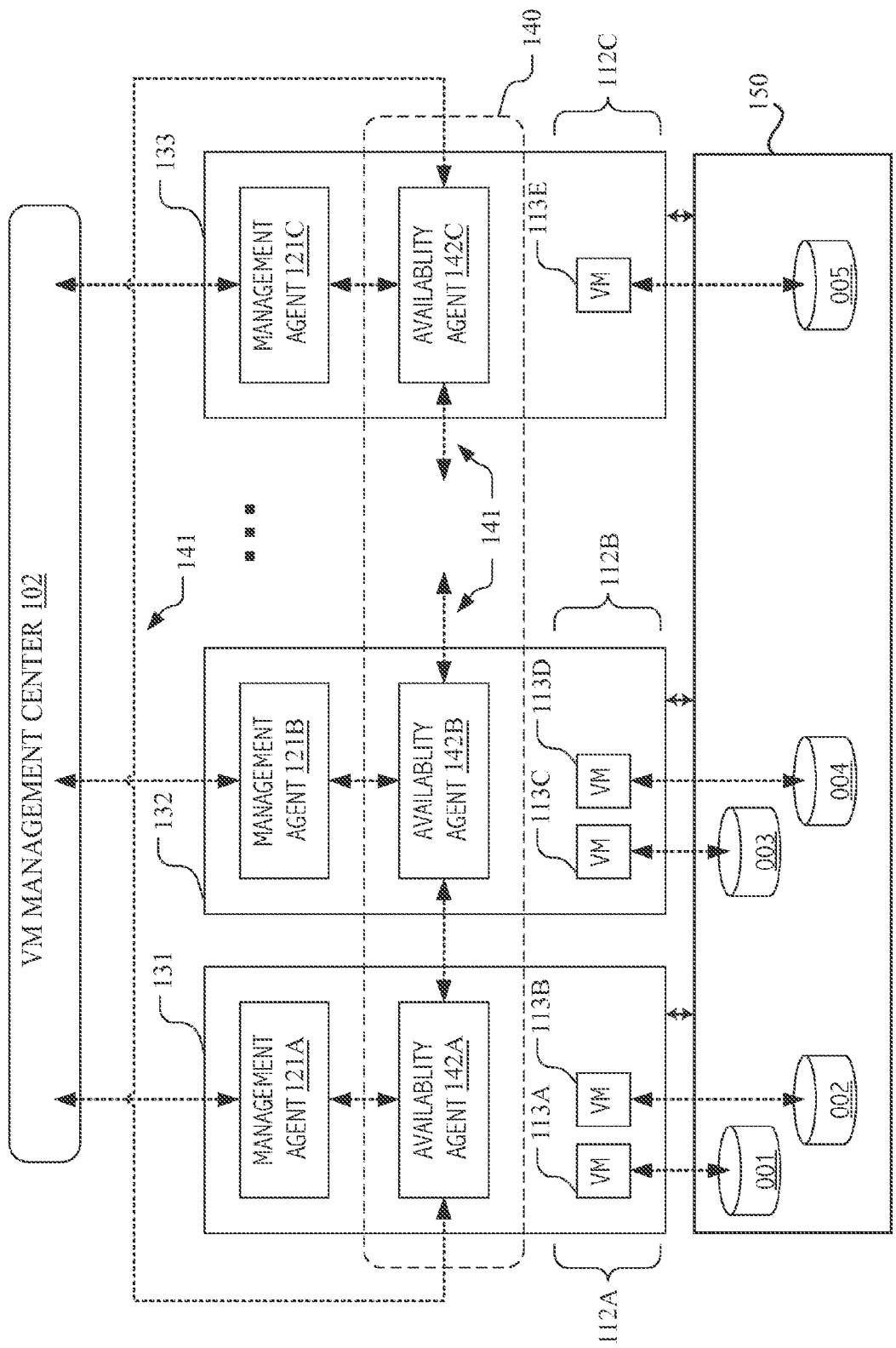
FIGS. 1A and 1B further illustrate failover operation of a virtual machine cluster, according to one or more embodiments of the invention.
Figure 1B:
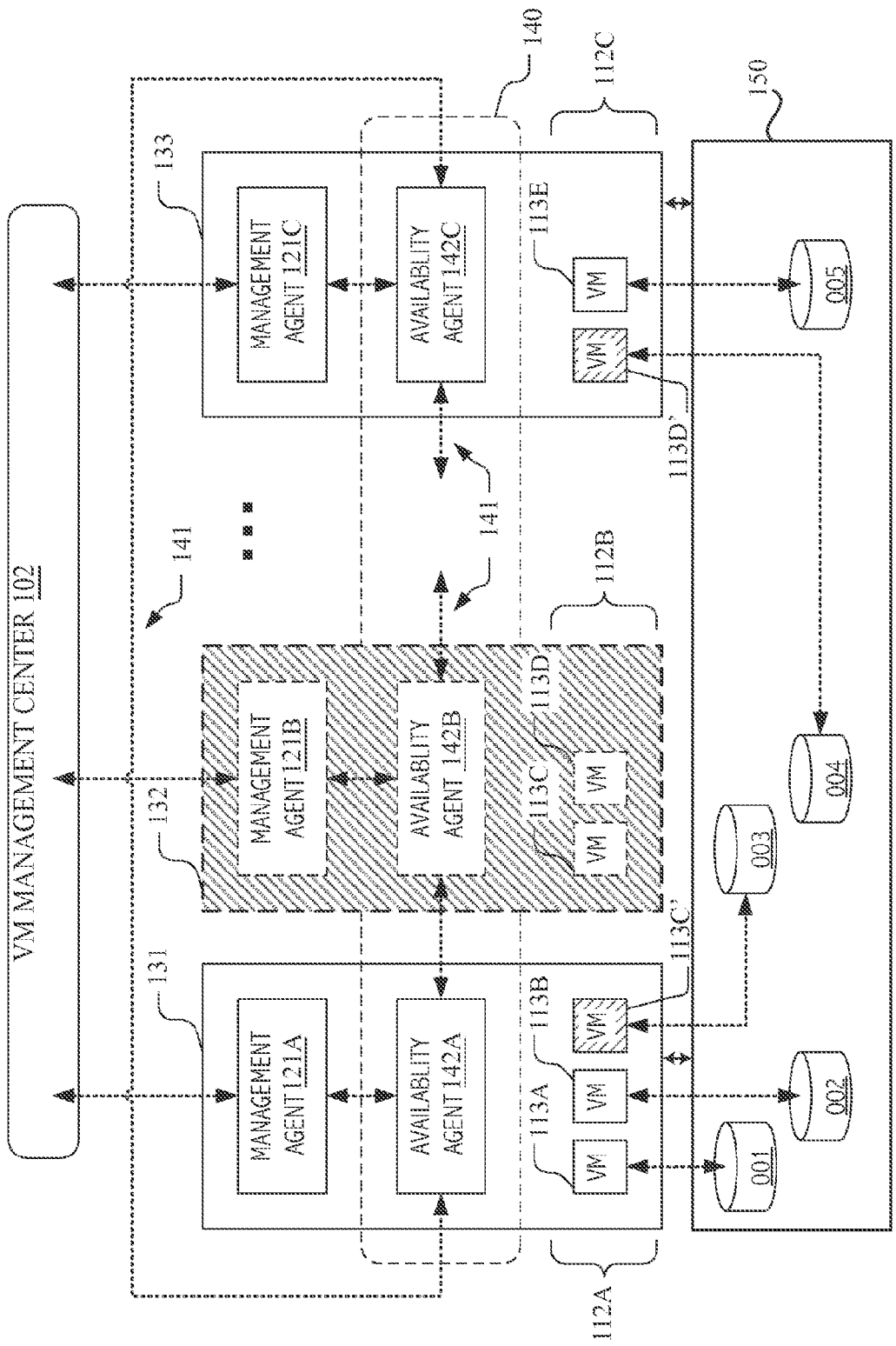

FIGS. 1A and 1B further illustrate failover operation of a virtual machine cluster, according to one or more embodiments of the invention. Host computers 131, 132, 133 (also referred to herein as "servers") are configured to deliver virtualization-based distributed services to information technology environments. Each host computer 131, 132, 133 provides a virtualization layer that abstracts processor, memory, storage, and/or networking resources into multiple virtual machines that run side-by-side on the same physical host computer. In one embodiment, virtualization software can be installed directly on the server hardware and inserts a virtualization layer between the hardware and the operating system. The virtualization software partitions a physical host computer into multiple secure and portable virtual machines that run on the same physical server. Each virtual machine represents a complete system—with processors, memory, networking, storage, and/or BIOS (basic input/output system).

A virtual machine (VM) management center 102 is also included in the system. The VM management center 102 manages the virtual infrastructure, including managing the host computers 131, 132, 133, the virtual machines running within each host computer, provisioning, migration, resource allocations, and so on. According to some embodiments, user access controls of the VM management center 102 provide customizable roles and permissions so an administrator can create roles for various users by selecting from an extensive list of permissions to grant to each role. Responsibilities for specific virtualized infrastructure components, such as resource pools, can be delegated based on business organization or ownership. VM management center 102 can also provide full audit tracking to provide a detailed record of every action and operation performed on the virtual infrastructure.

The virtual machines 113A-113E run on top of a virtual machine monitor (not shown), which is a software interface layer that enables sharing of the hardware resources of host computer by the virtual machines. Virtual machine monitor may run on top of the operating system of the host computer or directly on hardware components of the host computer. In some embodiments, virtual machine monitor runs on top of a hypervisor that is installed on top of the hardware resources of host computer. Together, the virtual machines and virtual machine monitor create virtualized computer systems that give the appearance of being distinct from host computer and from each other. Each virtual machine includes a guest operating system and one or more guest applications. The guest operating system is a master control program of the virtual machine and, among other things, the guest operating system forms a software platform on top of which the guest applications run.

In some embodiments, a Distributed Resource Scheduling (DRS) module within the VM management center 102 provides the ability to view and manage the resources in the virtual computing environment. In some embodiments, the DRS module provides automatic initial virtual machine placement on any of the host computers, and also makes automatic resource relocation and optimization decisions as hosts or virtual machines are added or removed from the virtual environment. The DRS module can also be configured for manual control, in which case the DRS module makes recommendations that a user or administrator who can review and carry out the changes manually. For example, the DRS could determine that a particular VM should migrate from a first host computer to a second host computer. In addition, in some embodiments, the VM management center 102 and/or the DRS may also determine that certain host computers should be powered on or off based on the workload in the virtual computing environment.

In one embodiment, data storage for host computers 131, 132, 133 is served by a storage area network (SAN), which includes one or more storage arrays and a switch that connects host computer to the one or more storage arrays.

One or more embodiments of the invention further provide that, upon detection of a failure, a high availability system (HAS) restarts the affected workloads (i.e., virtual machines) after choosing where the workload should run. To ensure the HAS can meet its service level objectives, the HAS service includes a highly reliable placement engine. However, the capabilities of the placement engine may be limited based on resource constraints on the system where the placement engine is being run or the placement engine lacking global information such as historical load statistics. Consequently, embodiments of the invention enable the HAS to consult with an external resource scheduler, such as the DRS. Such consultation must not violate the service level objectives. Embodiments of the invention describe a technique to opportunistically query an independent resource scheduler while the HAS system still meets the availability objectives.

In particular, FIG. 1A illustrates a distribution of virtual machine computations prior to a failover triggering event, while FIG. 1B illustrates a distribution of virtual machine computations after such an event. According to one embodiment, virtualization systems 112A, 112B, 112C are illustrative of nodes of a multi-node cluster implemented using multiple instances of VMware ESX Server virtualization software executing on hosts 131, 132, 133, respectively, and managed as a resource pool using VMware VirtualCenter management server software. A shared storage system 150 (e.g., a SAN-based system such as previously described) provides suitable storage volumes (e.g., LUNs 001, 002, 003, 004 and 005). As described above, individual storage volumes or sets thereof include both a backing representation of virtual machine state and a description of the hardware system virtualized by a respective virtual machine.

For each host 131, 132, 133 a corresponding high-availability agent (HAA) is provided (see, e.g., HAA 142A, 142B, 142C). Together, the HAAs are responsible for failure detection and for maintaining and/or communicating relevant status and/or configuration information sufficient to restart an affected VM on an alternate host. In general, the design of HAAs and related protocols and/or storage (collectively shown as high availability system (HAS) 140) provides such functionality without a single point of failure. In the illustrated configuration, a replicated distributed representation of status/configuration is presumed and a ring-topology, redundant path communication scheme is illustrated such that any single failure is tolerable and each surviving host possesses or has access to sufficient information to effectuate failovers described herein. The examples provided below are merely exemplary of one implementation of a HAS 140.

According to various embodiments, both an ability to detect a failure and an ability to access information necessary or helpful to effectuate a failover response should survive failures that a high-availability cluster is designed to tolerate. Embodiments are described that involve total failure of a single host (e.g., host 132); however, based on the description herein persons of ordinary skill in the art will appreciate adaptations that would allow a high-availability cluster in accordance with the present invention to tolerate partial failures and/or multiple failures. Because existing commercially-available software systems (e.g., Veritas™ Cluster Server for VMware ESX and EMC™ AutoStart™ failover automation software) exist that provide a packaged framework for meeting the basic failure detection and distributed or replicated information representation challenges described above, embodiments are described in a context consistent with such systems. Nonetheless, based on the description herein, persons of ordinary skill in the art will appreciate alternative configurations and solutions that may or may not leverage functionality of such packaged frameworks.

In view of the foregoing, and without limitation, assume high availability system 140 includes HA agents 142A, 142B, 142C with the following properties. An HA agent runs on each host and can be used to communicate with and amongst other components of the HA system, such as other HA agents, via path 141. The HA system can detect whether a host in the cluster has failed. A failure-robust information representation is provided by the high availability system 140, which can be populated with information descriptive of the set of virtual machines running on the hosts together with additional meta-information. This information is available (whether by replication or fault-tolerant communications) on surviving hosts and can be used in case of host failures. Whenever a host failure occurs, the high availability system 140 can use the descriptive information to cause a virtualization host to restart an affected virtual machine. Specific techniques for achieving the foregoing are now described.

Referring to FIG. 1A, an administrative user with access to VM management center 102 configures a failover cluster by grouping a set of virtualization hosts 131, 132, 133 (e.g., creating a cluster), and enabling a HAS 140 on the cluster. The configurations (including, for example, resources needed to start a VM, compatible hosts for a VM, cluster configuration information, startup priorities, etc.) are propagated to the individual hosts. In the illustrated configuration, management agents 121A, 121B, 121C are employed as intermediaries in this communication and, like the VM management center 102, need not be fully fault tolerant, but may integrate with other data center facilities, provisioning, automation, optimization, and/or other facilities provided in a management system such as provided by VMware VirtualCenter software. Other mechanisms for propagating failover configuration information to an HA system 140 may be employed in other embodiments.

In some embodiments, an administrator using VM management center 102 need not configure failover on a per-VM basis. Rather, virtual machines created or moved into the cluster may automatically inherit high-availability attributes. As more completely described below, the management system may compute and propagate to high availability (HA) system 140 at least a baseline set of failover information. For example, in some embodiments, VM management center 102 employs admission control criteria and pre-computes a set of primary and alternate host assignments for each VM that may be admitted to the cluster consistent with the criteria. The assignments ensure that the cluster as a whole reserves sufficient excess capacity to tolerate a predetermined number of failures (typically a single failure) and establishes a priori to strategy for rehosting of affected VMs to alternate hosts in the event of such a failure.

In some embodiments, a dynamic resource scheduling (DRS) algorithms can be employed to refine or update the configuration information associated with VMs or hosts based on actual or evolving load conditions. Similarly, in some realizations, the configuration information can be updated/recomputed when changes result from planned operations (e.g., scheduled power down of a VM) or VM migration (e.g., transparent migration of an executing VM from one virtualization system to another using VMotion® technology).

In the illustration of FIG. 1A, VM management center 102 configures the HA agents 142A, 142B, 142C on hosts 131, 132, 133, respectively, with information about which VMs need to be failed-over in the event of a host failure. Each VM is uniquely identified in a host-independent way, e.g., using the unique identifier or LUN for the storage volume in which the VM's backing state and its virtualized hardware configuration are stored. Although many information codings are possible, one suitable representation is as a table replicated or reliably accessible on each host or on a sufficient subset of hosts in which a current host, an alternate host and a corresponding LUN are identified for each VM. Using such information, each surviving HA agent is able to identify (i) the set of VMs affected by a host failure, (ii) which, if any, affected VMs are to be restarted in the associated local virtualization system, and (iii) for each VM to be restarted on the local virtualization system, the storage volume or volumes in which both a definition of the VM and its state data may be stored.

In the illustrated configuration, LUN 001 stores a backing representation of virtual machine state for VM 113A and a description of the hardware system virtualized by VM 113A. Similarly, LUN 002 stores a backing representation of virtual machine state for VM 113B and a description of the hardware system virtualized by VM 113B, LUN 003 stores a backing representation of virtual machine state for VM 113C and a description of the hardware system virtualized by VM 113C, LUN 004 stores a backing representation of virtual machine state for VM 113D and a description of the hardware system virtualized by VM 113D, and LUN 005 stores a backing representation of virtual machine state for VM 113E and a description of the hardware system virtualized by VM 113E.

FIG. 1B illustrates the results of failover after high availability (HA) system 140 has detected a failure of host 132, according to one embodiment of the invention. As described, the HA system 140 is responsible for detecting the failure of a host or relevant components, devices, services applications or subsystems thereof and, as described above, restarting the affected virtual machines on respective alternate hosts. In FIG. 1B, VMs 113C and 113D are affected by a failure of or on host 132.

In one embodiment, in a given host and virtual machine configuration, a particular virtual machine can exhibit dependencies on at least some components and/or facilities of the host, e.g., use of particular network adapters, host-bus adapters, or other hardware. In some configurations, dependencies on software components or dependencies on services or connectivity may also exist. HA agents may report to each other regarding operational status or, in some situations, may remotely probe or interrogate other HA agents. Similarly, guest software (e.g., an operating system (OS) or other software system) can provide information that signals whether the guest software is functioning properly. The signals can be as simple as ensuring the guest OS remains responsive, or may include application-level or service-level monitoring (e.g., determine whether a web-server responsive or whether a Quality of Service (QOS) commitment being met).

In some embodiments, even soft failures, degraded operation, or failures within a given VM may be detected and handled by HA system 140. In some embodiments, all detected failures on a host are presumed to affect all VMs executing thereon. In other embodiments, HA system 140 may evaluate the impact of a particular failure on a VM-by-VM basis and respond accordingly. In some embodiments, certain failures trigger a failover response for affected virtual machines when detected by the HA system 140.

In general, once a host failure or VM failure is detected, HA system 140 determines which VMs are affected and which alternative host of the cluster should be used to restart each affected VM. In the illustrated configuration, virtual machines (e.g., VMs 113A, 113B, 113C, 113D and 113E)

were initially allocated to virtualization systems of the cluster. Any of a variety of resource allocation constraints may be employed including load balance, VM co-location, capacity or performance requirements, network connectivity or specialized hardware/device support provided by an underlying host system, among others. One or more of these factors may be useful in selecting failover targets.

According to various embodiments, a selection of failover targets may be performed at any time, including after failure detection, and by any suitable decision system. In some embodiments, a runtime response of the HA system 140 can devolve to a simple retrieval of a predetermined failover response and restart of VMs in accordance with the predetermined response. In such a system, predetermination and update of a failover response can be performed using facilities that are not themselves fault tolerant, as long as failure detection and failover response mechanisms are robust to failures. In this manner, some of the complexities of coordinated distributed decision making in the presence of failures can be avoided. In some embodiments, admission control, load-balance, and/or distributed resource scheduling may be implemented using fault-tolerant system methods and employed in the determination of an appropriate failover response. These and other variations will be understood based on the description that follows.

As described above, upon detection of a failure, a high availability system (HAS) restarts the affected workloads (i.e., virtual machines) after choosing where the workload should run. To ensure the HAS can meet its service level objectives, the HAS service includes a highly reliable placement engine. However, the capabilities of the placement engine may be limited based on resource constraints on the system where the placement engine is being run or the placement engine lacking global information such as historical load statistics. Consequently, embodiments of the invention enable the HAS to consult with an external resource scheduler. Such consultation must not violate the service level objectives. Embodiments of the invention describe a technique for the HAS to opportunistically query an independent resource scheduler while still meeting the availability objectives.

Figure 2:
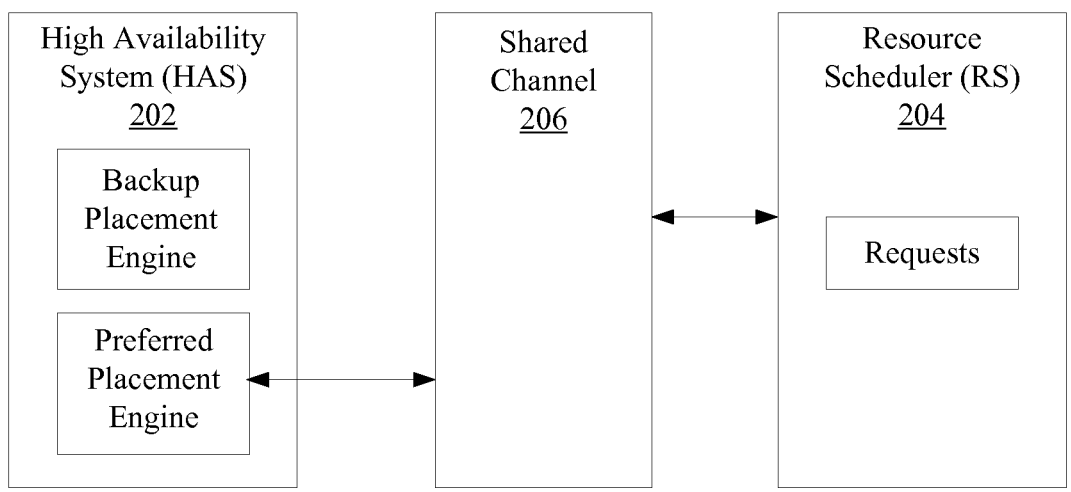
FIG. 2 is a conceptual diagram of a high availability system configured to communicate with a resource scheduler via a shared channel, according to one embodiment of the invention.

FIG. 2 is a conceptual diagram of a high availability system 202 configured to communicate with a resource scheduler 204 via a shared channel 206, according to one embodiment of the invention. Embodiments of the invention assume that the high availability system (HAS) 202 does not have privileges to actively invoke a command to an independent load balancing resource scheduler (RS) 204. In one embodiment, RS 204 is administrated by a separate authority, such as VM management center 102, and services requests for more than one client. Instead of direct invocation, there is a shared channel 206 through which both HAS 202 and RS 204 can read and write signals with data that the other party can access. The channel 206 is potentially built over a public or private network, e.g., when RS 204 is running on a separate system from the HAS 202. One embodiment also assumes the RS 204 does not execute the placement that the RS 204 generates. Instead, the restart actions are executed by the HAS 202. In an alternative embodiment, a procedure within RS 204 is capable of executing placement actions. While RS 204 might take an arbitrarily long time to generate or execute a placement decision, the HAS 202 must still provide a guaranteed failover time. Also, in some situations, the RS 204 is not available; thus, the HAS 202 cannot rely on the RS 204 for placement decisions and has to use a backup placement engine.

According to various embodiments, the HAS 202 has two registered placement engines (PEs). A first PE (i.e., a "preferred PE") may be in communication with RS 204, and a second PE (i.e., a "backup PE") may comprise a placement engine that is consistently available and is able to make placement decisions within the time specified by the service agreement. However, the backup PE does not guarantee to make optimal placement decisions. According to one embodiment, when HAS 202 detects a failure and builds a list of VMs that need to be restarted, HAS 202 uses the procedure described in FIG. 3 to restart these VMs.

Figure 3:
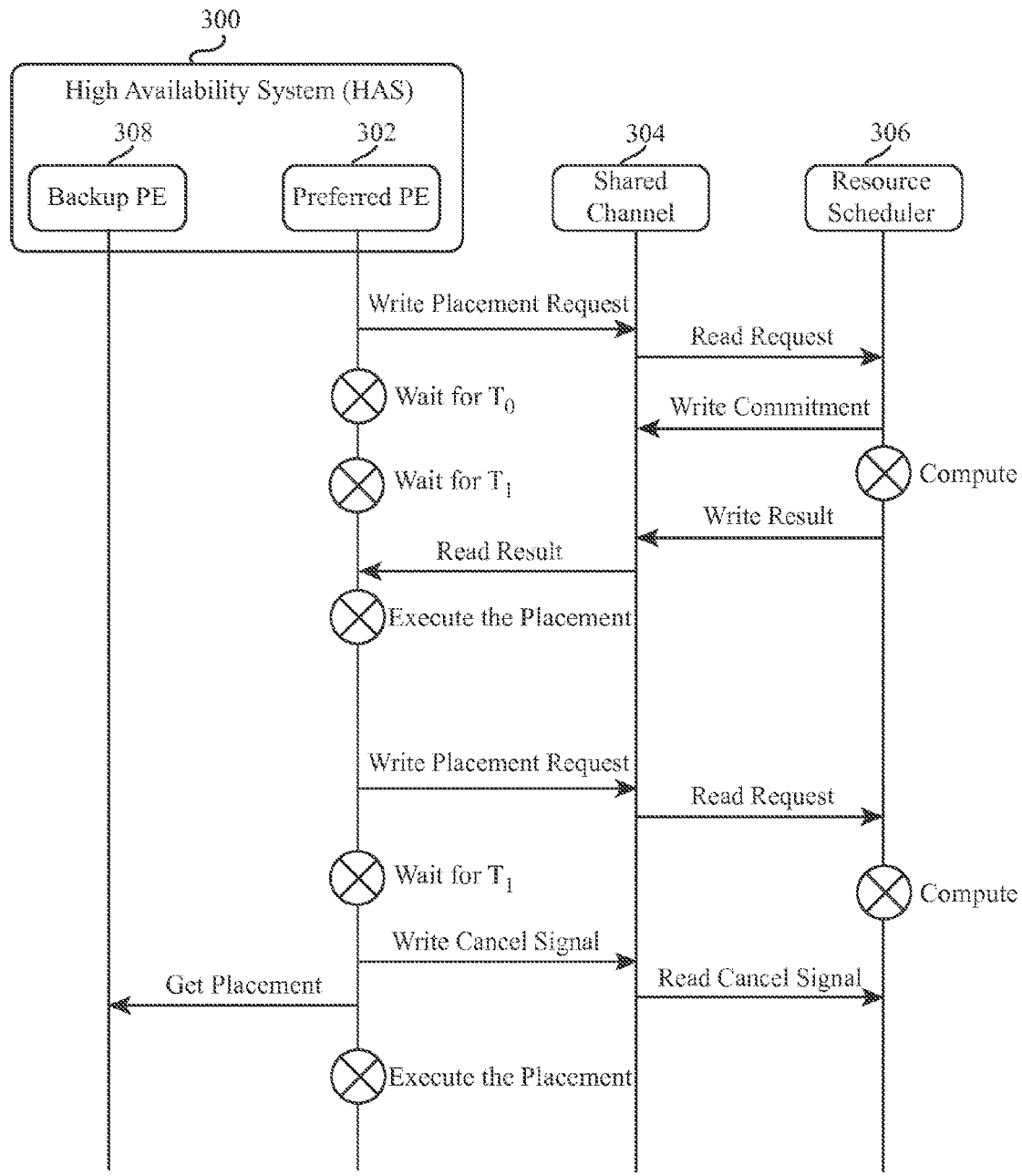
FIG. 3 is a conceptual event sequence diagram of a high availability system configured to execute placement of a VM, according to one embodiment of the invention.

FIG. 3 is a conceptual event sequence diagram of a high availability system 300 configured to execute placement of a VM, according to one embodiment of the invention. As shown, the preferred PE 302 writes a signal to the shared channel 304 that indicates there is a placement request. The identity of all the VMs is encoded in the request.

The preferred PE 302 waits for a period ($T_0$) and checks whether there is a commitment signal posted by Resource Scheduler (RS) 306. A commitment signal posted by the RS 306 indicates that the RS 306 is available to compute placements for one or more of the VMs. The RS 306 then computes the placement of the one or more VMs based on at least the load in the virtual environment. Other factors may also be considered by the RS 306 when computing the placements. If a commitment signal is not posted by the RS 306 within the period ($T_0$), the backup PE 308 is invoked.

If the commitment signal is written to the shared channel 304, the preferred PE 302 waits for a period ($T_1$) and then reads the channel 304 to check whether the placement result is ready. In one embodiment, the period $T_1$ is fixed. In other embodiments, the preferred PE 302 reports how long the placement may take. If the time reported by the preferred PE 302 exceeds the service objectives, control continues as though the RS 306 does not write a commitment signal.

If the placement result is ready, the HAS 300 restarts the VM according to the placement result returned from the channel. If the RS 306 was unable to place all of the VMs that need restarting, the HAS 300 places these VMs on a pending list, and waits a timeout period before retrying the operation. In an alternate embodiment, the RS 306 tells the HAS 300 the conditions under which it makes sense to retry the placement, and the HAS 300 delays the retry until these conditions are satisfied.

If one or more of the attempted VM restarts fail, the HAS 300 places these VMs on a retry list. According to various embodiments, the HAS may retry immediately, after a delay, after a change in conditions such as the unreserved capacity of a host increases, after the conditions specified by the independent RS 306 are met, or after the independent RS 306 indicates a retry is feasible.

If, however, the placement result is not posted by the RS 306 within the period ($T_1$), the preferred PE 302 sends a cancel signal to the channel 304 that indicates that the preferred PE 302 will no longer need the placement of this request. Then, the HAS 300 calls the backup PE 308 and generates a placement. The HAS then restarts the VMs according to the placement. In an alternate embodiment, the backup PE 308 is invoked at the same time that the HAS 300 signals the preferred PE 302 to write a placement request to the shared channel 304. This parallel execution allows the HAS 300 to more quickly begin the recovery in the event that the independent RS 306 does not respond in time.

According to some embodiments, the RS 306, when available, works according to the following procedure. First the RS 306 reads the communication channel 304 to check whether there is a write placement request. If RS 306 finds a valid write placement request and the RS 306 is ready to accept the write placement request, then the RS 306 sends a commitment signal to the channel 304 and adds the request to its processing queue. In an alternate embodiment, the RS 306 may indicate how long it will take to prepare a recommendation. The RS 306 processes all its requests in the queue by priority. Before the RS 306 processes the request submitted by a given HAS 300, the RS 306 reads the channel 304 to check whether the cancel signal is issued and if so, skips the request and exits the procedure. The RS 306 processes the request and writes the result to the channel 304.

Figure 4:
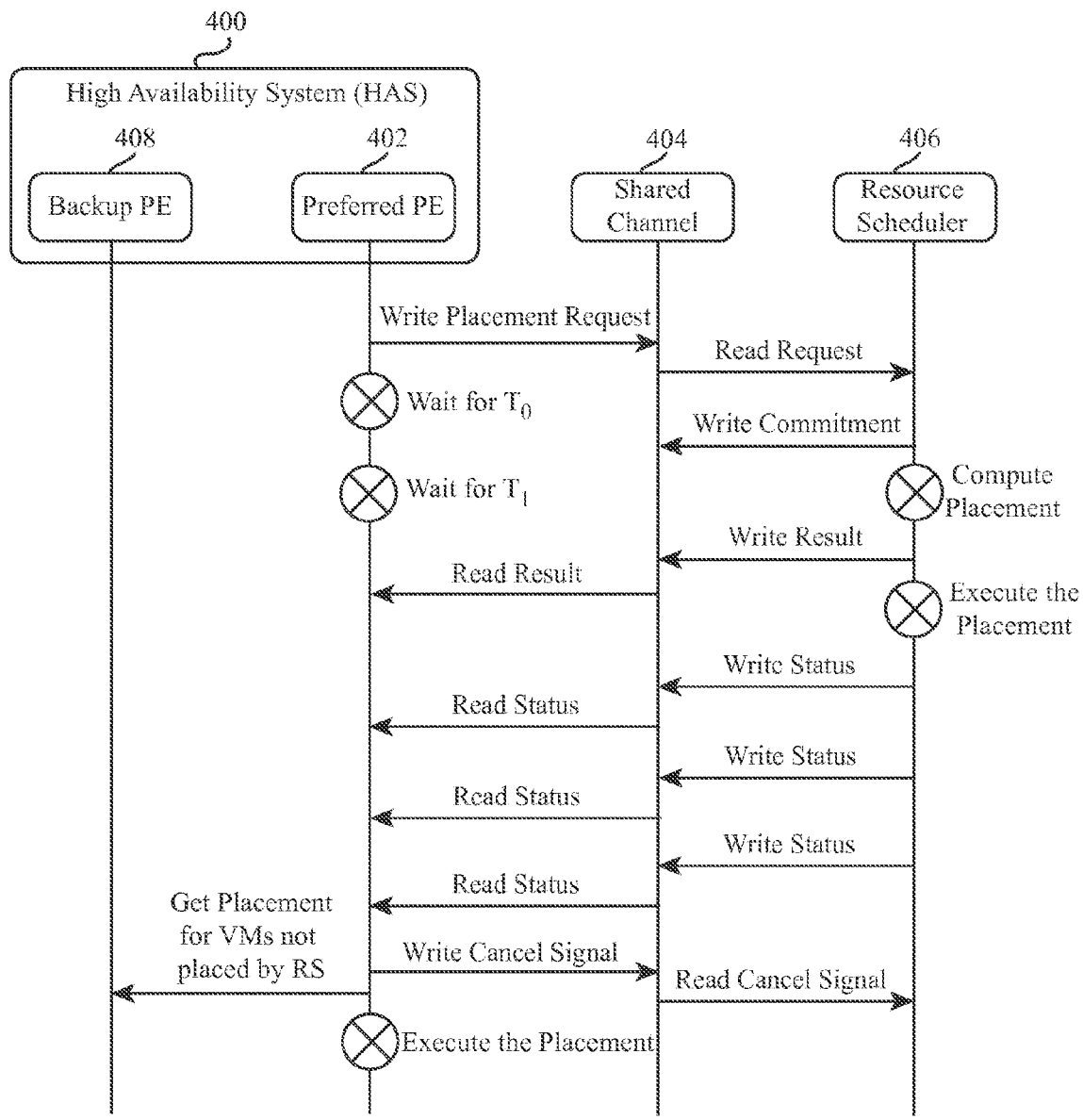
FIG. 4 is a conceptual event sequence diagram of a resource scheduler configured to execute placement of a VM, according to one embodiment of the invention.

In an alternate embodiment of the invention, the RS can perform the placement. FIG. 4 is a conceptual event sequence diagram of a resource scheduler (RS) 406 configured to execute placement of a VM, according to one embodiment of the invention.

In one embodiment, the HAS 400 system is adjusted so that the HAS 400 system waits for the RS 406 to complete the execution of the placement, and uses the backup PE 408 only when RS 406 cannot place one or more VMs. The HAS 400 does not try to restart the VMs simultaneously with RS 406, for the reason that doing this will intervene the execution of RS 406 and causes restart to fail. When the HAS 400 detects a failure and builds a list of VMs that need to be restarted, the HAS 400 uses the following procedure to restart these VMs.

As shown, the preferred PE 402 writes a signal to the shared channel 404 that indicates there is a placement request. The identity of all the VMs is encoded in the request.

The preferred PE 402 waits for a period ($T_0$) and checks whether there is a commitment signal posted by RS 406. A commitment signal posted by the RS 406 indicated that the RS 406 is available to compute placements for one or more of the VMs. The RS 406 then computes the placement of one or more VMs based on at least the load in the virtual environment. Other factors may also be considered by the RS 406 when computing the placements.

If the commitment signal is written to the shared channel 404, the preferred PE 402 waits for a period ($T_1$) and then reads the channel 404 to check whether the placement result is ready. In one embodiment, the period $T_1$ is fixed. In other embodiments, the preferred PE 402 reports how long the placement may take. If the time reported by the preferred PE 402 exceeds the service objectives, control continues as though the RS 406 does not write a commitment signal.

If the placement result is ready, the HAS 400 starts to periodically poll the channel 404 for an execution progress update for a period $T_2$. The HAS 400 computes the set of VMs for which the RS 406 has not executed a placement, and the set of VMs for which the RS 406 has not restarted after $T_2$, the preferred PE 402 sends a cancel signal to the channel 404, and calls the backup PE 408 to request a placement for the union of the two sets.

According to some embodiments, the RS 406, when available, works according to the following procedure. First the RS 406 reads the communication channel to check whether there is a write placement request. If RS 406 finds a valid write placement request and the RS 406 is ready to accept the write placement request, then the RS 406 sends a commitment signal to the channel and adds the request to its processing queue. In an alternate embodiment, the RS 406 may indicate how long it will take to prepare a recommendation. The RS 406 processes all its requests in the queue by priority. Before the RS 406 processes the request submitted by a given HAS 400, the RS 406 reads the channel to check whether the cancel signal is issued and if so, skips the request and exits the procedure. In sum, the RS 406 services the write placement request, computes the placement, and executes the placement. The RS 406 periodically writes to the channel 404 the set of VMs that are being restarted until there are no more such VMs. When RS 406 reads a cancel signal of a set of VMs from the channel, this means that the HAS 400 has decided not to wait for the execution and instead the HAS 400 has started to execute the placement itself. In this case, RS 400 skips the specified VMs.

According to various embodiments, multiple RS modules can be configured to access the shared channel. For example, each RS module could be managing a different set of hosts. In such embodiments, any one of the RS modules can service the placement request.

Figure 5:
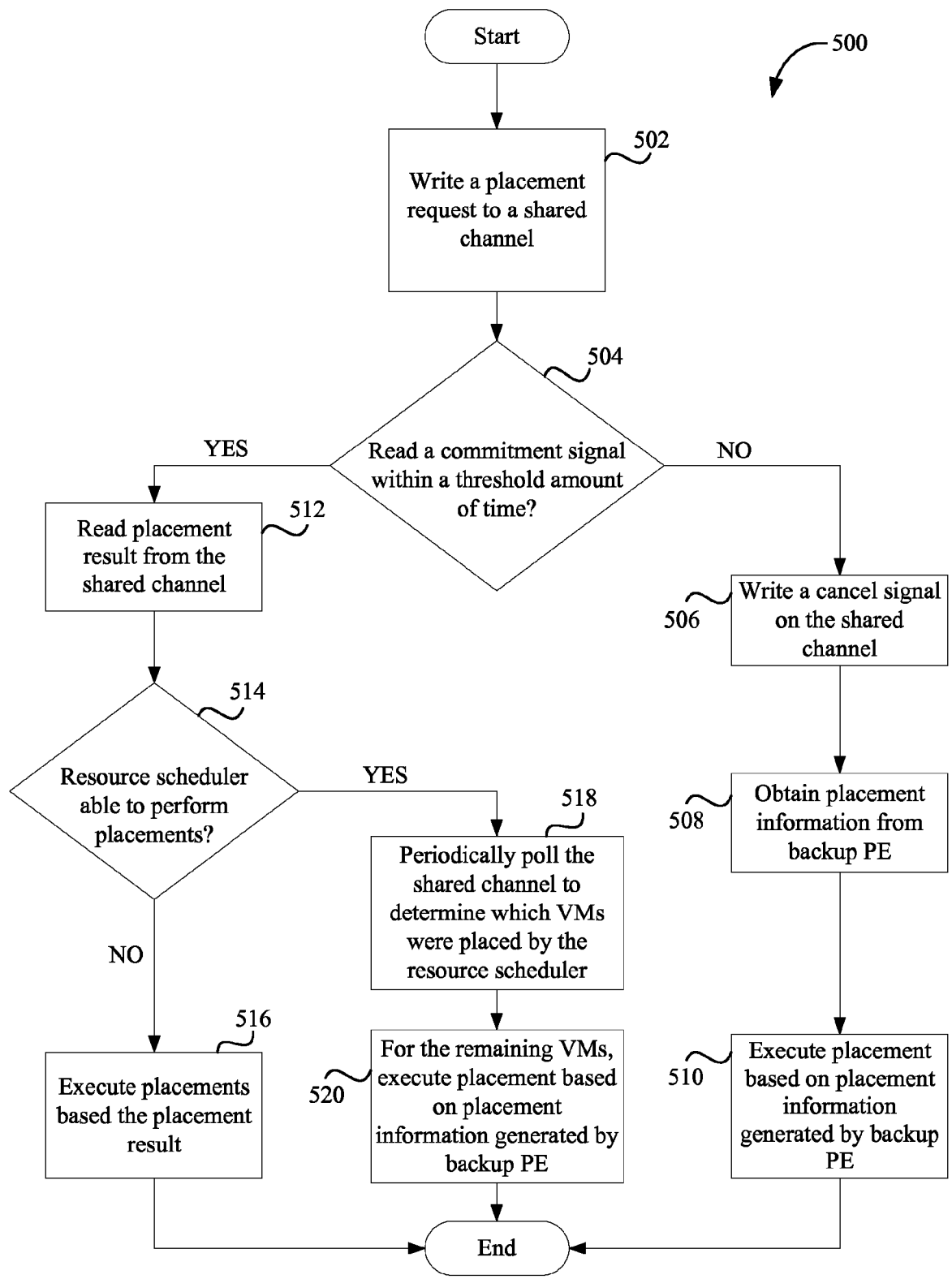
FIG. 5 is a flow diagram of method steps for executing placements of one or more VMs, according to one embodiment of the invention.

FIG. 5 is a flow diagram of method steps for executing placements of one or more VMs, according to one embodiment of the invention. Persons skilled in the art would understand that, even though the method 500 is described in conjunction with the systems of FIG. 1A-6, any system configured to perform the method steps, in any order, is within the scope of embodiments of the invention.

As shown, the method 500 begins at step 502, where a placement engine writes a placement request to a shared channel. A resource scheduler also has access to the shared channel and can read and write signals to the shared channel. At step 504, the placement engine determines whether a commitment signal is read from the shared channel within a threshold amount of time. As described, the HAS must meet certain service objectives. Thus, the HAS cannot simply wait arbitrarily long for the resource scheduler to provide placement information.

If the placement engine determines that a commitment signal is not read from the shared channel within the threshold amount of time, then the method proceeds to step 506. At step 506, the placement engine writes a cancel signal on the shared channel indicating that the placement engine no longer needs the resource scheduler to compute the placement request. At step 508, the placement engine obtains placement information from a backup placement engine. In some embodiments, the backup placement engine is configured to make quick, but suboptimal placements in order to meet service objectives. At step 510, the placement engine executes placement of the VM based on placement information generated by the backup placement engine.

Referring back to step 504, if the placement engine determines that a commitment signal is read from the shared channel within the threshold amount of time, then the method proceeds to step 512. At step 512, the placement engine reads a placement result from the shared channel. The placement result was computed by the resource scheduler and takes into account at least a load placed on one or more portions of the virtual environment.

At step 514, the placement engine determines whether the resource scheduler is able to perform placements. If the placement engine determines that the resource scheduler is not able to perform placements, then the method proceeds to step 516. At step 516, the placement engine executes placements based the placement result read from the shared channel.

If the placement engine determines that the resource scheduler is able to perform placements, then the method proceeds to step 518. At step 518, the placement engine periodically polls the shared channel to determine which VMs were placed by the resource scheduler. After a certain amount of time has passed, at step 520, for the remaining VMs that have not been placed by the resource scheduler, the placement engine executes placement based on placement information generated by the backup placement engine.

Figure 6:
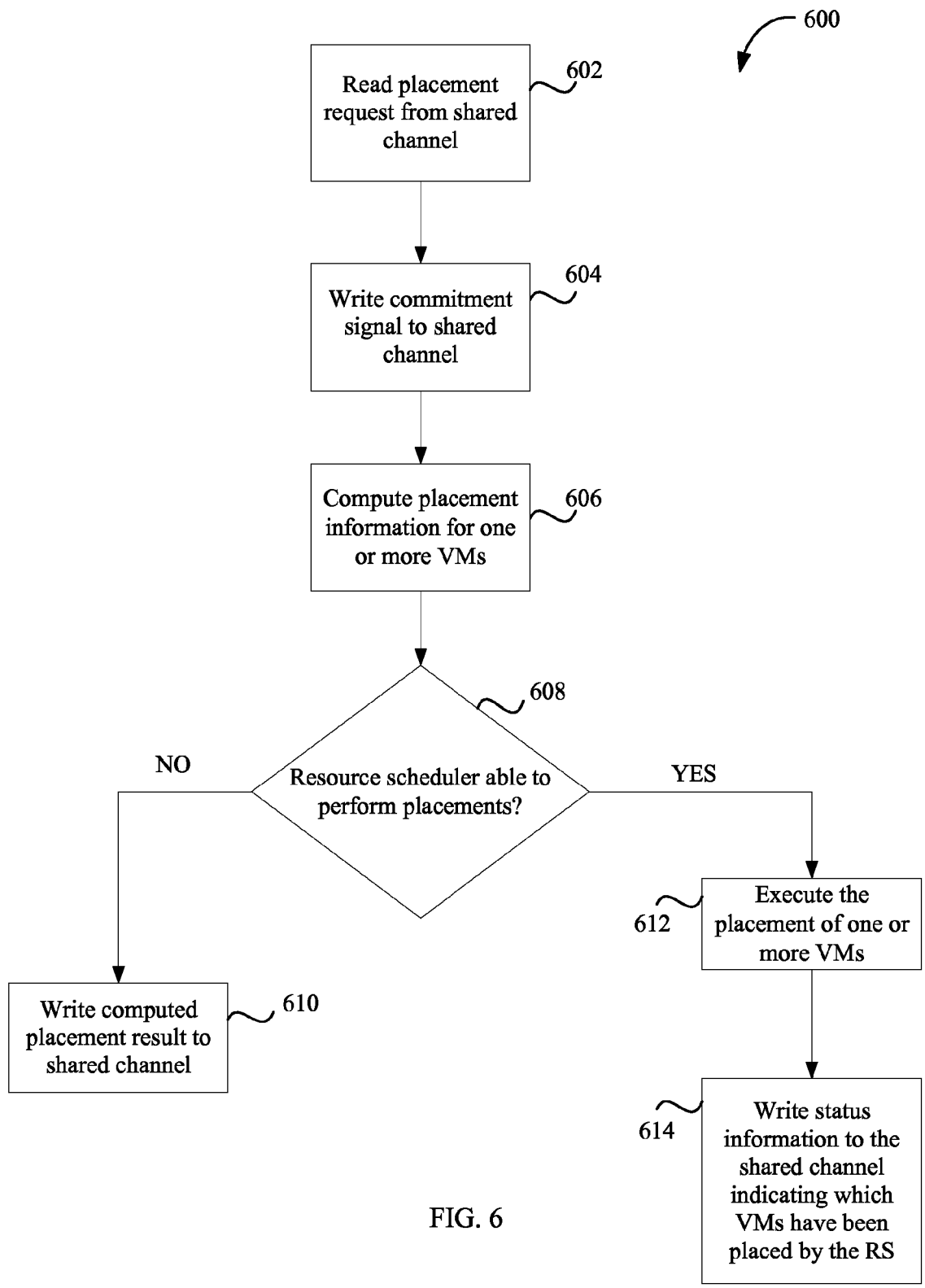
FIG. 6 is a flow diagram of method steps for a Resource Scheduler (RS) to compute placements of one or more VMs, according to one embodiment of the invention.

FIG. 6 is a flow diagram of method steps for the Resource Scheduler (RS) to compute placements of one or more VMs, according to one embodiment of the invention. Persons skilled in the art would understand that, even though the method 600 is described in conjunction with the systems of FIG. 1A-6, any system configured to perform the method steps, in any order, is within the scope of embodiments of the invention.

As shown, the method 600 begins at step 602, where a resource scheduler reads a placement request from a shared channel. The placement request was written to the shared channel by a placement engine included in a HAS.

At step 604, the resource scheduler writes a commitment signal to the shared channel. The commitment signal indicates that the resource scheduler is able to process the placement request within a time required by the placement engine and service objectives. At step 606, the resource scheduler computes placement information for one or more VMs associated with the placement request. The computation is based on at least the load of one or more portions of the virtualized environment.

At step 608, if the resource scheduler is able to perform placements, the method 600 proceeds to step 612. At step 612, the resource scheduler executes the placement of one or more VMs. At step 614, the resource scheduler writes status information to the shared channel indicating which VMs have been placed by the resource scheduler. Any remaining VMs that are not placed by the resource scheduler can be placed by the placement engine.

If, at step 608, the resource scheduler is not able to perform placements, the method 600 proceeds to step 610. At step 610, the resource scheduler writes a computed placement result to the shared channel. A placement engine is configured to read the placement result from the shared channel and execute the placement in accordance with the placement result.

In sum, one or more embodiments of the invention provide a technique for restarting affected workloads by taking into account global information for the virtualized environment, such as load. A high availability system (HAS) is configured to write placement requests to a shared channel that is also accessible by a global resource scheduler. The resource scheduler reads the write placement requests and computes an optimal placement for the affected workloads. The HAS and/or the resource scheduler then executes the placements. By providing these features, the techniques according to one or more embodiments provide a more efficient technique for restarting failed workloads.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for restarting a virtual machine in a virtual computing system having a plurality of hosts and a resource scheduler for the plurality of hosts, comprising:
   detecting failure of one of the plurality of hosts or a component therein on which the virtual machine depends;
   writing a placement request for the virtual machine to a shared channel that is accessible by the resource scheduler;
   determining whether a commitment signal is written to the shared channel by the resource scheduler, wherein the commitment signal indicates either that the resource scheduler is able to compute a first placement result within a first amount of time or a second amount of time the resource scheduler is expected to take to compute the first placement result;
   if the commitment signal is written to the shared channel and a service objective specifying a guaranteed time during which placement of the virtual machine must be achieved is satisfied, waiting and then reading the first placement result from the shared channel, wherein the first placement result is generated by the resource scheduler responsive to the placement request;
   if the commitment signal is not written to the shared channel or the service objective is not satisfied, obtaining a second placement result for the virtual machine from a backup placement engine which makes placement decisions within the guaranteed time specified by the service objective; and
   restarting the virtual machine in accordance with the first placement result or the second placement result.

2. The method of claim 1, wherein the first placement result is based on a resource load of at least one of the plurality of hosts.

3. The method of claim 1, further comprising:
   in response to not receiving the commitment signal within a threshold amount of time, writing a cancel signal to the shared channel.

4. A method for computing placement results for a virtual machine in a virtual computing system, comprising:
   reading a placement request for the virtual machine from a shared channel, the placement request being written to the shared channel upon detecting failure of a host computer or a component therein on which the virtual machine depends;
   writing a commitment signal to the shared channel if a first placement result can be computed within an amount of time so as to satisfy a service objective specifying a guaranteed time during which placement of the virtual machine must be achieved, wherein if the first placement result cannot be computed within the amount of time so as to satisfy the service objective, a second placement result is computed by a backup placement engine which makes placement decisions within the guaranteed time specified by the service objective;
   if the first placement result can be computed within the amount of time so as to satisfy the service objective, computing the first placement result for the virtual machine based on the placement request read from the shared channel, wherein the first placement result includes information corresponding to a backup host computer on which the virtual machine is to be restarted; and
   writing the first placement result to the shared channel, wherein the virtual machine is restarted in accordance with the first placement result or the second placement result.

5. The method of claim 4, wherein a placement engine in a high availability system (HAS) is configured to restart the virtual machine in accordance with the first placement result based on reading the first placement result from the shared channel.

6. The method of claim 4, further comprising:
   restarting the virtual machine in accordance with the first placement result; and
   writing a status signal to the shared channel indicating that the virtual machine has been restarted.

7. The method of claim 4, wherein computing the first placement result is based on a resource load of at least one of a plurality of hosts configured to execute virtual machines.

8. A non-transitory computer-readable storage medium comprising instructions that, when executed in a computing device, causes the computing device to restart a virtual machine in a virtual computing system having a plurality of hosts and a resource scheduler for the plurality of hosts, by performing the steps of:
   detecting failure of one of the plurality of hosts or a component therein on which the virtual machine depends;
   writing a placement request for the virtual machine to a shared channel that is accessible by the resource scheduler;
   determining whether a commitment signal is written to the shared channel by the resource scheduler, wherein the commitment signal indicates either that the resource scheduler is able to compute a first placement result within a first amount of time or a second amount of time the resource scheduler is expected to take to compute the first placement result;
   if the commitment signal is written to the shared channel and a service objective specifying a guaranteed time during which placement of the virtual machine must be achieved is satisfied, waiting and then reading the first placement result from the shared channel, wherein the first placement result is generated by the resource scheduler responsive to the placement request;
   if the commitment signal is not written to the shared channel or the service objective is not satisfied, obtaining a second placement result for the virtual machine from a backup placement engine which makes placement decisions within the guaranteed time specified by the service objective; and
   restarting the virtual machine in accordance with the first placement result or the second placement result.

9. The non-transitory computer-readable storage medium of claim 8, wherein the first placement result is based on a resource load of at least one of the plurality of hosts.

10. The non-transitory computer-readable storage medium of claim 8, the steps further comprising:
    in response to not receiving the commitment signal within a threshold amount of time, writing a cancel signal to the shared channel.

11. A non-transitory computer-readable storage medium comprising instructions that, when executed in a computing device, causes the computing device to compute placement results for a virtual machine in a virtual computing system, by performing the steps of:
    reading a placement request for the virtual machine from a shared channel, the placement request being written to the shared channel upon detecting the failure of a host computer or a component therein on which the virtual machine depends;
    writing a commitment signal to the shared channel if a first placement result can be computed within an amount of time so as to satisfy a service objective specifying a guaranteed time during which placement of the virtual machine must be achieved, wherein if the first placement result cannot be computed within the amount of time so as to satisfy the service objective, a second placement result is computed by a backup placement engine which makes placement decisions within the guaranteed time specified by the service objective;

if the first placement result can be computed within the amount of time so as to satisfy the service objective, computing the first placement result for the virtual machine based on the placement request read from the shared channel, wherein the first placement result includes information corresponding to a backup host computer on which the virtual machine is to be restarted; and writing the first placement result to the shared channel, wherein the virtual machine is restarted in accordance with the first placement result or the second placement result.

12. The non-transitory computer-readable storage medium of claim 11, wherein a placement engine in a high availability system (HAS) is configured to restart the virtual machine in accordance with the first placement result based on reading the first placement result from the shared channel.

13. The non-transitory computer-readable storage medium of claim 11, the steps further comprising:

restarting the virtual machine in accordance with the first placement result; and writing a status signal to the shared channel indicating that the virtual machine has been restarted.

14. The non-transitory computer-readable storage medium of claim 11, wherein computing the first placement result is based on a resource load of at least one of a plurality of hosts configured to execute virtual machines.

* * * * *